United States Patent
Toy

(10) Patent No.: US 10,193,864 B2
(45) Date of Patent: Jan. 29, 2019

(54) CLOUD INTERFACE FOR USE OF CLOUD SERVICES

(71) Applicant: Comcast Cable Communications, LLC, Philadelphia, PA (US)

(72) Inventor: Mehmet Toy, Allendale, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 275 days.

(21) Appl. No.: 14/860,641

(22) Filed: Sep. 21, 2015

(65) Prior Publication Data

US 2016/0088068 A1 Mar. 24, 2016

Related U.S. Application Data

(60) Provisional application No. 62/052,897, filed on Sep. 19, 2014, provisional application No. 62/220,476, filed on Sep. 18, 2015.

(51) Int. Cl.
| | |
|---|---|
| *G06F 15/16* | (2006.01) |
| *H04L 29/06* | (2006.01) |
| *H04L 29/08* | (2006.01) |
| *H04L 12/46* | (2006.01) |

(52) U.S. Cl.
CPC ...... *H04L 63/0272* (2013.01); *H04L 67/1097* (2013.01); *H04L 12/4641* (2013.01); *H04L 69/321* (2013.01)

(58) Field of Classification Search
CPC ............. H04L 63/0272; H04L 67/1097; H04L 69/321; H04L 12/4641
See application file for complete search history.

(56) References Cited

U.S. PATENT DOCUMENTS

| | | | | |
|---|---|---|---|---|
| 2006/0262735 A1* | 11/2006 | Guichard | ................ | H04L 12/66 370/254 |
| 2008/0049764 A1* | 2/2008 | Solomon | ................. | H04L 12/66 370/401 |
| 2012/0198335 A1* | 8/2012 | Huang | .............. | G06F 17/30867 715/716 |
| 2013/0091284 A1* | 4/2013 | Rothschild | .............. | G06F 3/067 709/226 |
| 2013/0191454 A1* | 7/2013 | Oliver | .................... | G06Q 10/10 709/204 |
| 2013/0268357 A1* | 10/2013 | Heath | ..................... | H04L 63/00 705/14.53 |
| 2013/0311778 A1* | 11/2013 | Cherukuri | ........... | H04L 41/0803 713/171 |

(Continued)

*Primary Examiner* — Richard G Keehn
(74) *Attorney, Agent, or Firm* — Banner & Witcoff, Ltd.

(57) ABSTRACT

Methods, systems, computer-readable media, and apparatuses are disclosed for providing a user seamless access to cloud services made available by multiple different cloud providers. In some embodiments, a computing device may receive a request from a user to access a variety of cloud services. The computing device may retrieve cloud services from each of the cloud providers and cause display of a user interface that includes each of the cloud services from the different cloud providers so that the user interface is a uniform point of contact with the cloud providers. Further, in some embodiments, various interfaces, cloud service connections, and cloud service connection termination points may be defined.

18 Claims, 11 Drawing Sheets

(56) References Cited

U.S. PATENT DOCUMENTS

| | | | |
|---|---|---|---|
| 2015/0026772 A1* | 1/2015 | Verma | H04L 63/0884 |
| | | | 726/4 |
| 2015/0095237 A1* | 4/2015 | Naik | G06Q 10/00 |
| | | | 705/59 |
| 2015/0199715 A1* | 7/2015 | Caron | G06Q 30/0241 |
| | | | 705/14.52 |

* cited by examiner

CLOUD INTERFACE FOR USE OF CLOUD SERVICES

RELATED APPLICATIONS

This application claims priority to U.S. provisional application No. 62/052,897, filed Sep. 19, 2014 and U.S. provisional application No. 62/220,476, filed Sep. 18, 2015, each of which is incorporated by reference in its entirety.

BACKGROUND

Today, many individuals or organizations access resources provided and/or performed by remote networked computing device, often referred to as the "cloud." Cloud providers enable their users to access services (such as networked services or cloud services) via any network, such as the Internet, intranet, and/or a combination thereof. The cloud services are provided by servers of the cloud provider. In some instances, a user may store information (e.g., documents, photographs, music, movies) on the cloud provider's server for access by multiple different devices associated with the user (e.g., after receiving login credentials). In many instances, the user interacts with a cloud service via either a dedicated application or through a web-based portal (e.g., a webpage). Many individuals may sign up for cloud services with multiple different cloud providers for a variety reasons. For instance, users may have a cloud service account with one cloud provider for use with particular computing devices, and may also have a cloud service account with a different cloud provider for use with other devices. For instance, some cloud providers may have a storage limit (e.g., 5 GB) on the amount data that may be stored either for free or under a particular subscription plan. In such an instance, once a user reaches the 5 GB storage limit with a cloud provider, the user may create an account with a different cloud provider to store additional information.

Subsequently, a user may wish to use services from multiple providers, and to access and/or otherwise view information the user has previously stored at multiple different cloud providers. However, in order to access such information, the user may have to separately login into each cloud provider separately. Once the user is logged into each of the cloud providers, the information provided/stored by each cloud provider may be viewed in separate windows of one or more applications or a web-based portal. That is, information from multiple different cloud providers might not be viewable in a single window. Lastly, because cloud providers use different proprietary standards for communication and/or use of a user's information, their corresponding cloud services cannot communicate with one another.

There will be an ever-present need for improved techniques for simpler access to cloud services provided by cloud providers in order to enhance a user's experience. These and other shortcomings are addressed by this disclosure.

SUMMARY

Various aspects of the disclosure provide more efficient, effective, functional, and convenient ways of providing a user with seamless access to multiple cloud services provided by different cloud providers.

In some embodiments, a computing device may receive a request from a user to access cloud services from multiple cloud providers. The computing device may retrieve the cloud services from the cloud providers. The computing device may aggregate the retrieved cloud services so that the computing device may cause display of single user interface including each of the cloud services from the cloud providers.

In some embodiments, a system may include a cloud carrier communicatively coupled to multiple cloud providers. The cloud provider may be configured to provide coordinated access of cloud services of the cloud providers to a cloud service user. The system may also include a cloud carrier cloud provider interface (CCCPI) for relaying communications between the cloud carrier and at least one of the cloud providers. The CCCPI may include a first layer, a second layer and a third layer. The third layer may include an internet protocol version 6 (IPv6) virtual private network (VPN) attribute and an internet protocol version 4 (IPv4) VPN attribute.

In some embodiments, a system may include a cloud carrier communicatively coupled to multiple cloud providers. The cloud carrier may be configured to provide coordinated access of cloud services of the cloud providers to a cloud service user. The system may also include a cloud service interface communicatively coupled to a virtual machine of a cloud provider of the plurality of cloud providers. The cloud service interface may include identifiers of one or more virtual machines, a list of network as a services employed by the one or more virtual machines, and a connection multiplexing attribute.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Some aspects discussed herein provide architectures, systems, methods, and apparatuses for enabling users to seamlessly interact with multiple content providers as though they are one content service provider. For instance, a user of a cloud carrier (e.g., a wired or wireless service provider) may, once authenticated by the cloud carrier, access remote storage of several different content providers without having to provide user access credentials to these content providers. Instead, the cloud carrier may automatically authenticate the user and act as a proxy to each of the content providers. As a result, for cloud storage cloud services, the user may interact with a user interface provided by the content carrier and the user interface may include the selectable folder or drivers representative of content stored for the user by at least one of the content providers.

In the following description of various example embodiments, reference is made to the accompanying drawings identified above, which form a part hereof, and in which is shown by way of illustration various embodiments in which aspects of the disclosure may be practiced. Other embodiments may be utilized and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Figure 1:
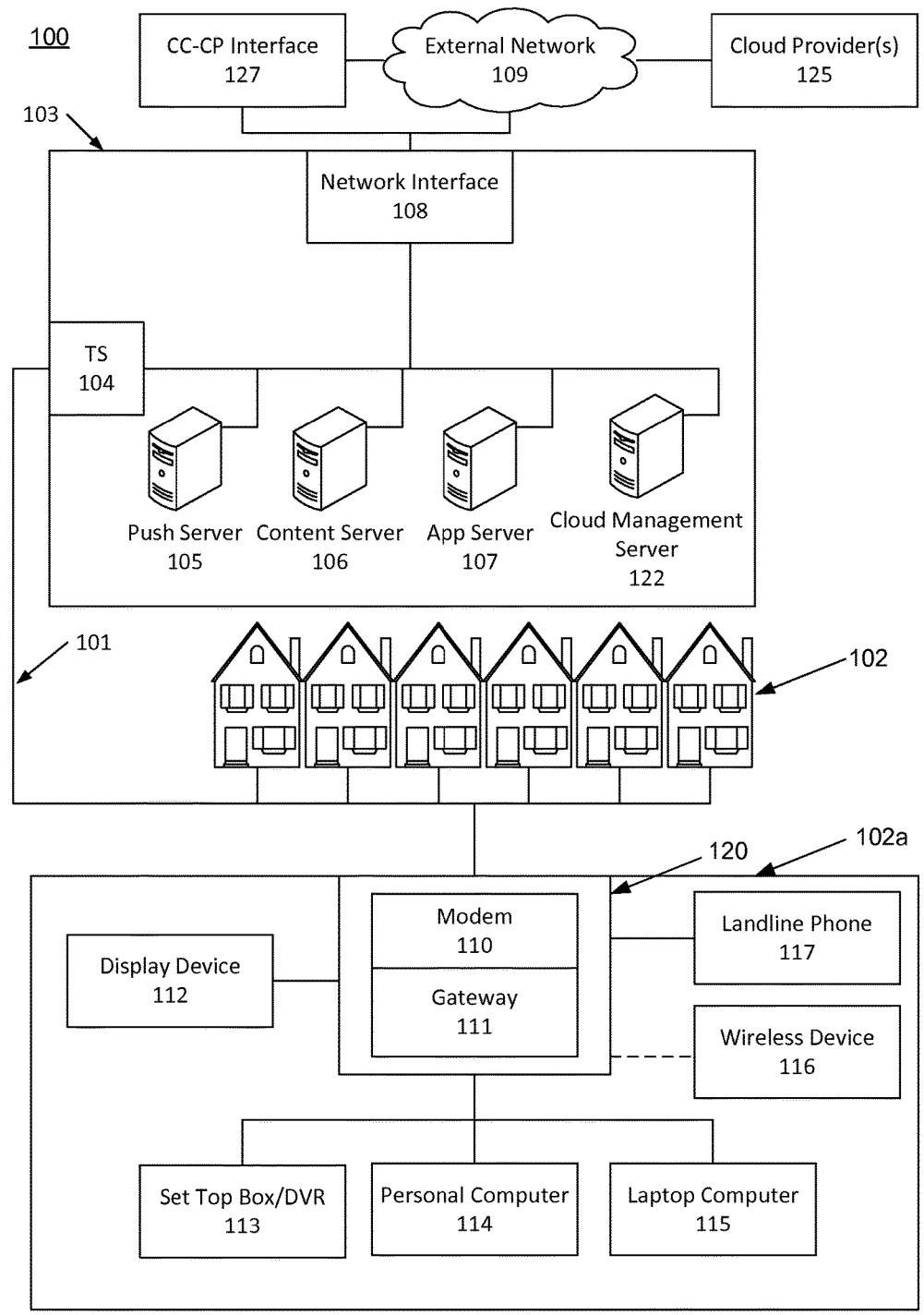
FIG. 1 depicts an example communication network on which various features described herein may be used.

FIG. 1 illustrates an example communication network 100 on which many of the various features described herein may be implemented. The communication network 100 may be any type of information distribution network, such as satellite, telephone, cellular, wireless, etc., or a combination thereof. One example may be an optical fiber network, a coaxial cable network, or a hybrid fiber/coax distribution network. The communication network 100 may use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly. Portions of the links 101 may also be implemented with fiber-optic cable, while other portions may be implemented with coaxial cable, other lines, or wireless communication paths.

The local office 103 may include an interface 104, such as a termination system (TS). More specifically, the interface 104 may be a cable modem termination system (CMTS), which may be a computing device configured to manage communications between devices on the network of the links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. An application server may be responsible for monitoring user viewing habits and collecting that information for use in selecting advertisements. An application server may be responsible for formatting and inserting advertisements in a video stream being transmitted to the premises 102. Although shown separately, one of ordinary skill in the art will appreciate that the push server 105, the content server 106, and the application server 107 may be combined. Further, here the push server 105, the content server 106, and the application server 107 are shown generally, and it will be understood that they may each contain memory storing computer executable instructions to cause a processor to perform steps described herein and/or memory for storing data.

An example premise 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines), a fiber interface node (for fiber optic lines), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may be a set-top box (STB), digital video recorder (DVR), a digital transport adapter (DTA), computer server, or any other desired computing device. The gateway interface device 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

The local office 103 may include a cloud management server 122. Although shown separately, the cloud management server 122 may be combined with one or more of the push server 105, the content server 106, and the application server 107. In one or more examples discussed herein, the cloud management server 122 may be a web server configured to manage communication between individual and multiple cloud providers. The cloud management servicer 122 may also be responsible for defining one or more interfaces described herein, cloud service connection, and cloud service connection termination points in terms of their attributes. The cloud management server 122 may be a cloud carrier as discussed below. The cloud management server 122 may be in communication with one or more cloud providers 125 via a cloud carrier cloud provider interface 127 (or directly, not shown) as discussed below.

Figure 2:
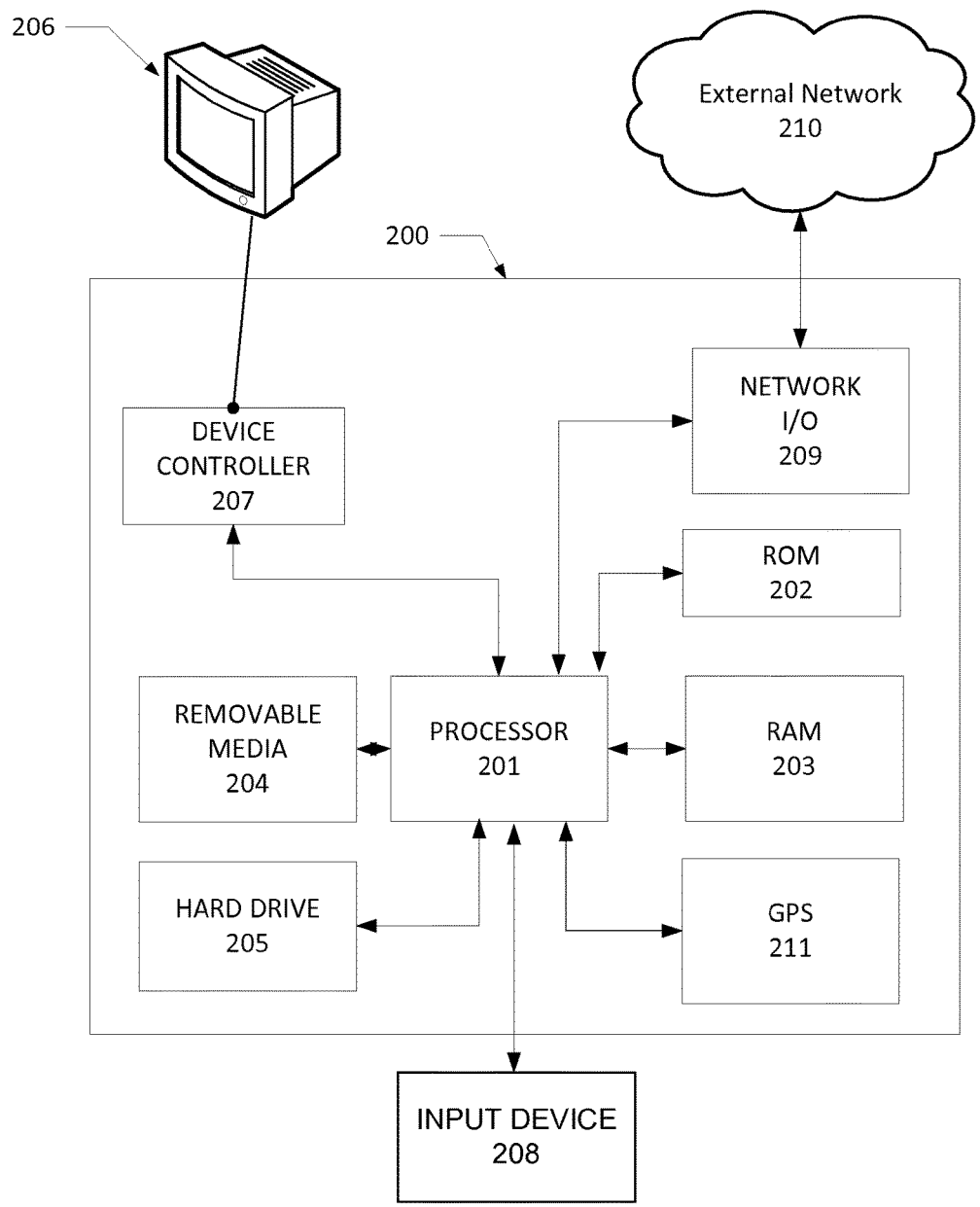
FIG. 2 depicts an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
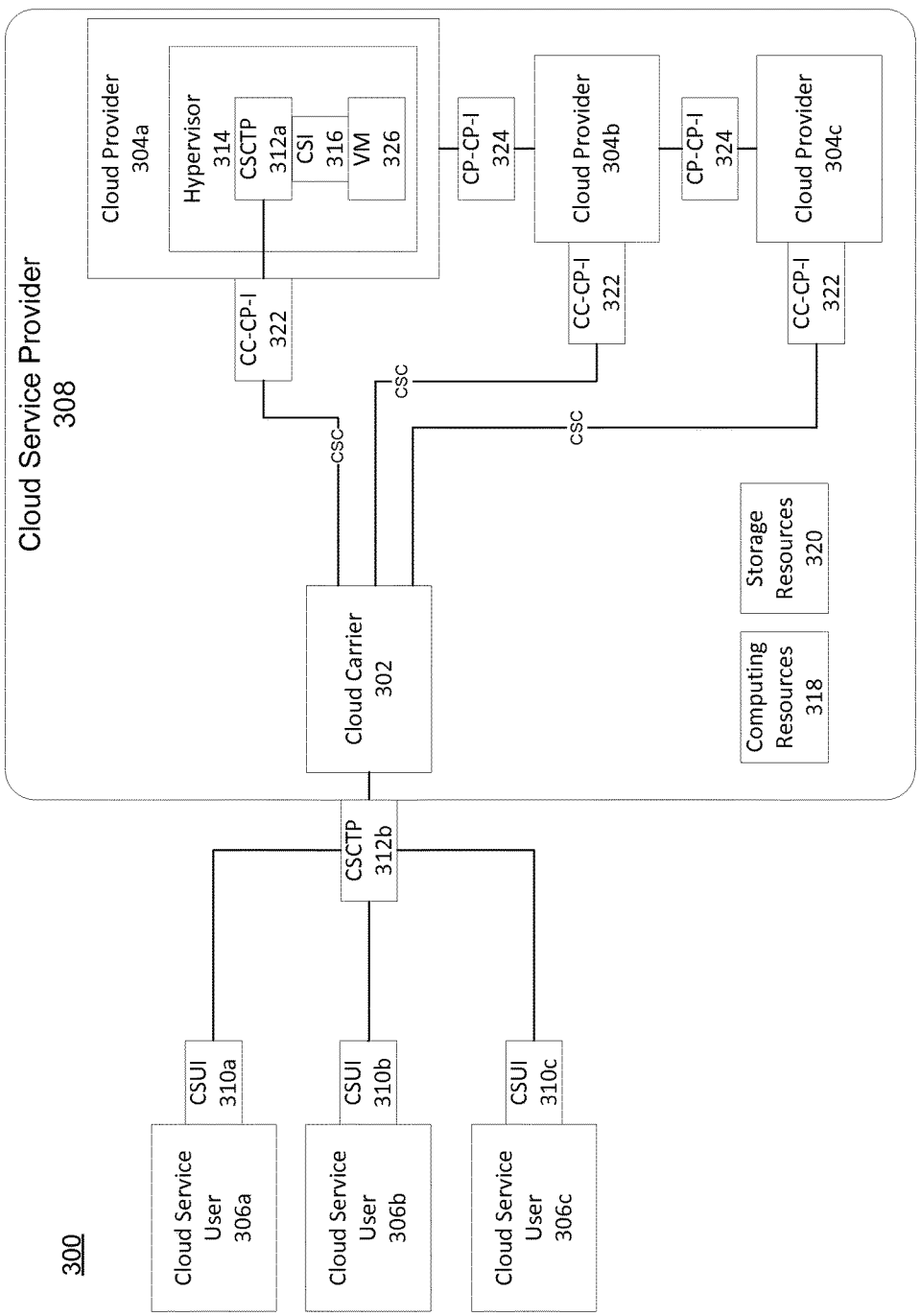
FIG. 3 depicts an example architecture used in accordance with one or more example aspects discussed herein.

FIG. 3 depicts an example architecture 300 used in accordance with one or more example aspects discussed herein. Under architecture 300, one or more cloud carriers 302 in combination with one or more cloud providers 304 may form a cloud service provider 308. The cloud service provider 308 (e.g., the combination of the cloud carriers 302 and cloud providers 304) may be responsible for providing end-to-end cloud services provided by the cloud providers 304 to one or more cloud service users 306.

A cloud provider 304 is responsible for making one or more cloud services available to its cloud service users 306. In some instances, a cloud provider 304 (e.g., cloud provider 304a) may include a hypervisor 314 or a container engine, which may be a software, firmware or hardware running on a server of the cloud provider 304 that enables creation, execution and managements of virtual machines (e.g., a virtual machine 326). In some instances, the hypervisor 314 may be a Type 1 or Type 2 hypervisor. The virtual machine 326 may be an emulation of a particular computer system, operating in a real or hypothetical computer. Its implementation may involve specialized hardware, software, or a combination of both, providing a complete substitute for the targeted real machine and a level of functionality for the execution of a complete operating system that may execute a single computer program.

The cloud provider 304a may provide virtual desktop and/or virtual application cloud services for use in multi-session environment. In such an environment, a different session may be set up for each of the cloud service users 306 currently wishing to use remote virtual desktop or remote virtual application cloud services. In a virtual desktop cloud service, an operating system, system resources, and applications are each virtualized for each user session in the multi-session environment. The cloud service users 306 (e.g., client devices) may remotely access and interact with an operating system, resources, and applications that are executed entirely on a server of the cloud provider 304 using inputs from the client devices. In a virtual application cloud service, some or all of the applications are virtualized (e.g., implemented as an executing application, without requiring a dedicated physical computing device). In some embodiments, the operating system and system resources might not be virtualized for each session and instead may be shared between user sessions. The cloud service users 306 (e.g., client devices) may remotely access and interact with applications that are executed entirely on a server of the cloud provider 304 using inputs from the client devices. In some instances, the cloud service users 306 may include a virtual machine receiver program or application to display the output of the virtual desktop, application, or resource (e.g., movie) in a window, browser, or other interactive window, and to transmit user inputs to the virtual machine. Examples of cloud providers 304 with such cloud services include VMWare™, Open Stack™, and the like.

In another example, cloud provider 304b may provide a cloud service that permits its cloud service users 306 to remotely store and access their information on a server or other computing device of the cloud provider 304b upon authentication of the cloud service user 306. A cloud service user's 306 information may include documents, books, pictures, music, TV shows, recordings, movies, games, and the like. The cloud service users 306 may access their information via a dedicated software application installed on the cloud service users' 306 computing device (e.g., smartphone, tablet, personal computer, laptop, work-provided computer, public computer, or other terminal) that is in communication with a server or other computing device of the cloud service provider 304b. For instance, the cloud provider 304b may setup a secure connection with the cloud service users' 306 computing device and transmit the information requested by the cloud service users' 306 computing device. Examples of cloud providers 304 with such cloud services include Microsoft™, IBM™, Google™, Apple™, Amazon™, etc.

In yet another example, cloud provider 304c may provide other cloud services. For instance, an infrastructure as a service (IAAS) is a category of cloud services where the capability provided by the cloud service provider 308 to the cloud service user 306 is to provision processing, storage, intra-cloud network connectivity services (e.g. VLAN, firewall, load balancer, and application acceleration), and other fundamental computing resources of the cloud infrastructure where the cloud service user 306 is able to deploy and run arbitrary applications. Software as a service (SAAS) is a category of cloud services where the capability provided to the cloud service user 306 is to use the cloud service provider's 304 applications running on a cloud infrastructure. Platform as a service (PAAS) is a category of cloud services where the capability provided to the cloud service user 306 is to deploy user-created or acquired applications onto the cloud infrastructure using platform tools supported by a cloud provider 304. Network as a service (NAAS) is a category of cloud services where an entity or a group of entities that deliver assured, dynamic cloud connectivity services via virtual, or virtual and physical service end points orchestrated over multiple operators' networks.

Prior to permitting use of a cloud service (e.g., accessing stored content) by cloud service users 306 to store their information and/or subsequently access their information, the cloud provider 304 may request and authenticate user access credentials. The cloud provider 304 may store user access credentials of multiple different cloud service users 306 in a local database and compare received user access credentials with stored user access credentials. If there is a match, the cloud service user 306 may be authenticated. Otherwise, the cloud service users 306 might not be authenticated and prevented from using the cloud service. The user access credentials may be in the form of a username and password, public key infrastructure (PKI) certificate, or the like.

The architecture 300 may include several different interfaces by which different entities (e.g., the cloud service users 306, the cloud carrier 302, and the cloud providers 304) communicate with one another. For instance, the architecture 300 may include a cloud service user interface (CSUI) 310 which may be developed into or set as a standard interface used by each of the cloud service users 306 to format information for use with cloud service provider 308 and to access one or more cloud services provided by cloud providers 304. The functionalities of the CSUI 310 may be distributed across the cloud service users 306 and the cloud service provider 308. As an example, the CSUI 310 may be split into two components, with one component residing at each of the cloud service users 306 and the other component residing at the cloud service provider 308 (e.g., at the cloud carrier 302).

The cloud carrier 302 serves as an intermediary that provides connectivity and transport between the cloud providers 304 and the cloud service users 306 or between two different cloud providers 304. The cloud carrier 302 may be a cable or wireless service provider, a network, or the like in communication with the cloud service users 306, and may be responsible for managing and defining the various interfaces described herein. In addition, the cloud carrier 302 may also be responsible for managing the communications between various entities described herein. For instance, cloud carrier 302 may be responsible for managing communications between the cloud service users 306 and the cloud providers 304, communications between the cloud service users 306 and the cloud carrier 302, communications between the cloud carrier 302 and the cloud providers 304, and communications between one cloud provider 304 (e.g., cloud provider 304a) and a different cloud provider (e.g., cloud provider 304b). As used herein, a cloud service connection (CSC) may refer to a communicative connection between two cloud service users 306, between a cloud service user 306 and a virtual machine provided by a cloud provider 304, and between two computing devices (or virtual machines) provided by different cloud providers 304.

As shown in FIG. 3, the architecture 300 may include a cloud carrier cloud provider interface (CC-CP-I) 322, if, for example, the cloud carrier 302 and cloud providers 304 are different entities. Otherwise, if the cloud carrier 302 and cloud providers 304 are the same entity, there might not be a CC-CP-I 322. However, for purposes of this description, the cloud carrier 302 and the cloud providers 304 are assumed to be different entities or some entities operating cloud services in different environments and, thus, the architecture 300 may include the CC-CP-I 322. In some cases, one cloud provider 304 (e.g., the cloud provider 304a) may wish to communicate with a different cloud provider 304 (e.g., the cloud provider 304b). In such cases, the cloud carrier 302 may serve as an intermediary relay between the two cloud providers 304a,b. A CSC may be setup with one segment of the CSC being between the cloud provider 304a and the cloud carrier 302 and the remaining segment of the CSC being between the cloud carrier 302 and the other cloud provider 304b. In some cases, one cloud provider 304 may wish to communicate with a different cloud provider 304 over the Internet through a gateway supporting CC-CP-I 322.

The architecture 300 may include a cloud service interface (CSI) 316 which serves as an interface for a cloud service supporting entity of the cloud provider 304 such as a virtual machine (e.g., the virtual machine 326). The interface may be used to format and relay communications between the cloud service supporting entity (e.g., the virtual machine 326) providing the cloud service and a cloud service connection termination point (CSCTP) 312 (e.g., CSCTP 312a). A CSCTP 312 may be a logical entity that originates or terminates a cloud service connection (CSC) at a logical or machine interface. In many instances, a CSCTP 312 may represent an edge or boundary of the cloud service provider 308. As shown in FIG. 3, there may be a CSCTP 312 (e.g., CSCTP 312b) communicatively connected with the cloud carrier 302. When a CSC is setup between a cloud service user 306 and a cloud provider 304 (or its virtual machine 326), the CSC established between the CSCTP 312b residing at the CSUI 310 and the CSCTP 312b residing at the CSI 316. While in FIG. 3, only cloud provider 304a is depicted has having a CSCTP, each of the other cloud providers 304b may also have one or more CSCTPs. Further, cloud providers 304b,c may also have a hypervisor, virtual machine, CSI, etc.

The architecture 300 may also include a cloud provider cloud provider interface (CP-CP-I) 324 which serves as an interface that permits the one cloud provider 304 (e.g., 304b) to communicated directly with another cloud provider 304 (e.g., 304c) without use of cloud carrier 302.

Once a CSC is established between the cloud service user 306 and the cloud providers 304, the cloud service user 306 may use the cloud services provided by the cloud providers 304. For instance, the cloud service user 306 may access a virtual desktop or a virtual application provided by a virtual machine resident on a server of the cloud provider 304.

In addition, the cloud service user 306 may wish to access storage of the user's information (e.g., stored movies, music, documents, etc.). The cloud service provider 308 may include physical and/or virtual computing resources 318 and storage resources 320, which may distributed between the cloud carrier 302 and the cloud providers 304. As a result of the implementation of the various interfaces (e.g., CSUI 310, CSI 316, CC-CP-I 322, and/or CP-CP-I 324), a cloud service user's 306 information stored at various cloud providers 304 may be stored by one or more of the cloud carrier 320 and/or other cloud providers 304. In some instances, for popular or frequently used information (e.g., a popular movie), a cloud provider 304 may transmit the movie to cloud carrier 302 for storage at its edge servers closest to one or more of the cloud service users 306. As a result, when a cloud service user 306 requests to retrieve the popular movie from the remote storage of a cloud provider, the popular movie may be already cached at an edge server geographically the closest to that cloud servicer user 306 and the edge server may transmit the popular movie to the requesting cloud service user 306. Thus, the time take for the cloud service user 306 to obtain the movie is reduced since the edge server is closer to the cloud service user 306 than the remote storage (e.g., server) of the cloud provider 304.

While, in some instances, cloud service users 306 may be computing devices of individuals using cloud service for personal use, in other instances, a cloud service user 306 may be one or more computing device of an enterprise with multiple users sharing the same cloud service user interface (CSUI) 310 discussed in detail below and using one or more gateway devices. The computing devices may be physical equipment, a virtual machine, or a collection of virtual machines with a virtual switch to switch between virtual machines. Individual functional elements in the computing devices may be either in the user domain or the cloud service provider domain (e.g., the cloud service provider 308 may manage the gateway device).

While the above description was described with reference to a single content service provider 308, in one or more embodiments, the architecture 300 may include one or more other content service providers 308 that are involved in providing cloud services to the cloud services users 306. These other cloud service providers may each be formed from one or more other cloud carriers 302 and one or more other cloud providers 304. Additionally, in these embodiments, the architecture 300 may also include a cloud service provider cloud service provider interface (CSP-CSP-I), which may be a standards interface for formatting and relaying communications between two cloud service providers 308. In this scenario, only one of the multiple cloud service providers 308 may interact with the cloud service users 306. For instance, the cloud service users 306 may interact with one cloud service provider 308, which may then relay communications to and from a different cloud service provider 308. In some instances, the cloud service providers 308 may employ a gateway to communicatively connect to one another. This gateway may utilize connection multiplexing among other features. As a result, the cloud service users 306 may be able to access cloud services provided by a collective of cloud service providers 308. In one instance, each of the cloud service providers 308 collectively providing cloud services may be private. In another instance, each of the cloud service providers 308 collectively providing cloud services may be public (e.g., accessible over the Internet). In yet other instances, one or more of the cloud service providers 308 collectively providing cloud services may be private and one or more of the cloud service providers 308 collectively providing cloud services may be public.

Figure 5:
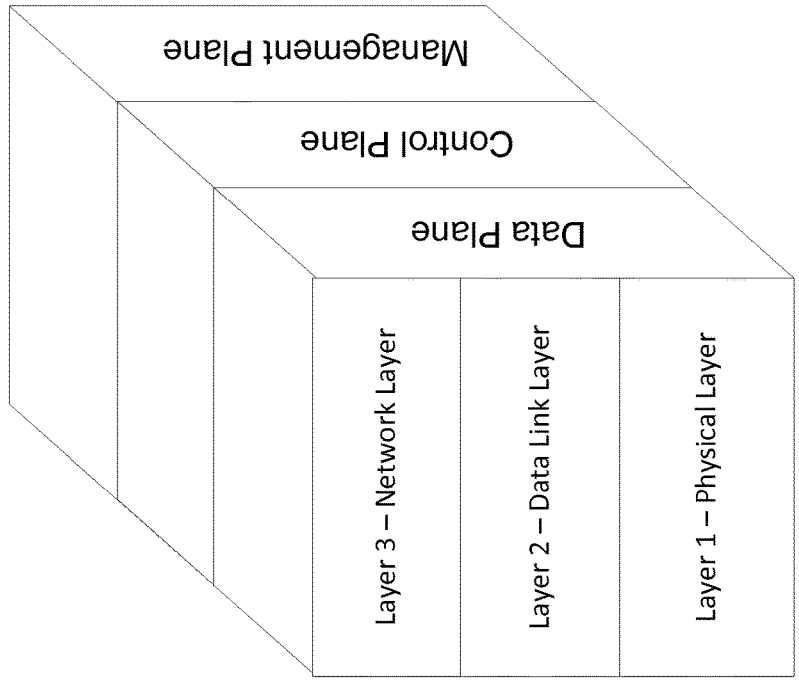
FIGS. 4-6 depict example protocol stacks in accordance with one or more example aspects discussed herein.
Figure 4:
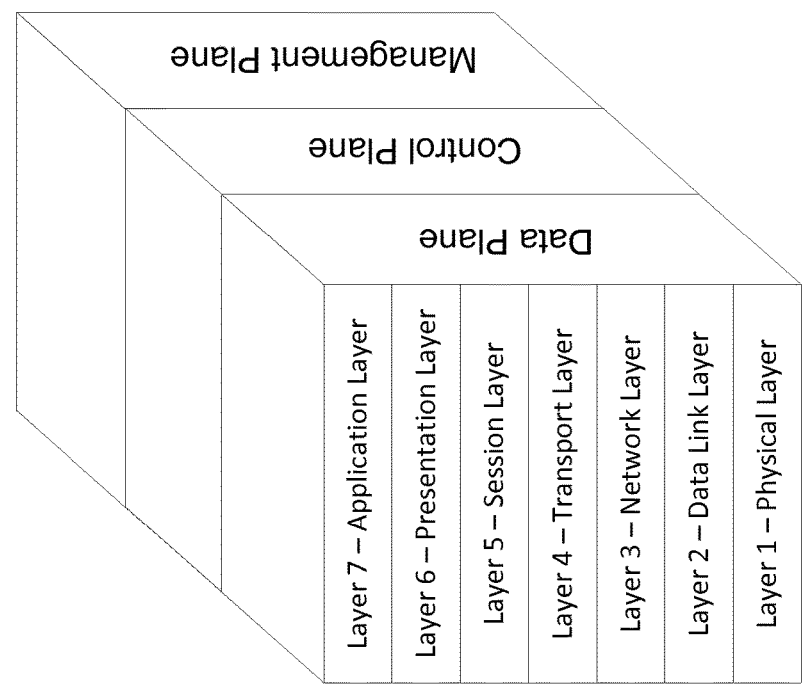
Figure 6:
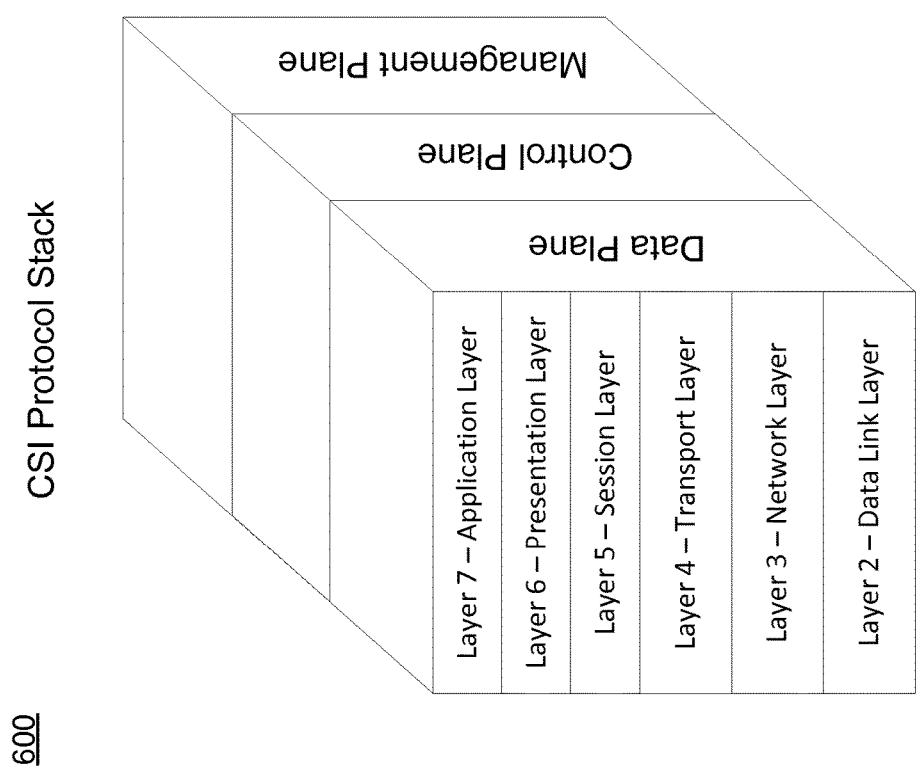

FIGS. 4-6 depict example protocol stacks in accordance with one or more example aspects discussed herein. FIG. 4 depicts an example protocol stack 400 for a CSUI 310 that has seven layers: layer 1 may be a physical layer (e.g., hardware components), layer 2 may be a data link layer, layer 3 may be a network layer, layer 4 may be a transport layer, layer 5 may be a session layer, layer 6 may be a presentation layer, and layer 7 may be an application layer. FIG. 5 depicts an example protocol stack 500 for an interface between content service providers 308, e.g., a CC-CP-I 322, and a CP-CP-I 324. The protocol stack 500 may have 3 layers: layer 1 may be a physical layer, layer 2 may be a data link layer, and layer 3 may be a network layer. FIG. 6 depicts an example protocol stack 600 for a CSI 316 having 6 layers. The protocol stack 600 might not have a physical layer (e.g., layer 1 discussed above) as CSI 316 interfaces with a virtual machine 326 itself. As a result, the protocol stack has 6 layers: layer 2 may be a data link layer, layer 3 may be a network layer, layer 4 may be a transport layer, layer 5 may be a session layer, layer 6 may be a presentation layer, and layer 7 may be an application layer. Further, each of the protocol stacks 400, 500, and 600 may include three planes: a data plane, a control plane, and a management plane.

The CSUI 310 may be defined by one or more of the following attributes. A CSUI identifier (ID) attribute may be an arbitrary string to identify the CSUI 310. A tenant ID attribute may identify a tenant that CSUI 310 belongs to (if an overlay network is supported at this interface). The tenant ID is globally unique in a given domain and based on virtual network identifiers such as VLAN IDs. In this context, a tenant may be an individual (e.g., cloud service user 306) using the virtual network (VN). In some instances, multiple VN identifiers may belong to a tenant. A NAAS ID attribute may identify a particular cloud provider 304 or cloud carrier 302 providing a NAAS. The CSUI's 310 physical interface (e.g., layer 1) may include an Ethernet attribute with fields for speed, mode, physical medium, and/or a media access control (MAC) layer. The physical layer may also include a DOCSIS attribute with fields for speed, mode, and physical medium. The physical interface may also include an Ethernet passive optical network (EPON) attribute with fields for speed and physical medium. The physical interface may include a gigabit-capable passive optical networks (GPON) attribute with fields for speed and physical medium. The physical interface may include a wavelength-division multiplexing (WDM) attribute with fields for speed and physical medium. The physical interface may include a synchronous optical networking (SONET) attribute and/or synchronous digital hierarchy (SDH) attribute with fields for speed and physical medium. The physical interface may include an optical transport network (OTN) attribute, a maximum transmission unit (MTU) attribute (with a recommended values of greater than or equal to 1522 bytes), a connection multiplexing attribute (which may include the options of yes or no), and a maximum number of connection termination points attribute. The CSUI's 310 layer 2 (e.g., the data link layer) may include Ethernet configuration attributes. Ethernet configuration attributes may include metro Ethernet forum (MEF) user network interface (UNI) service attributes for Ethernet private services found in table 11 of MEF 6.2 (see MEF 45 Multi-CEN L2CP, August, 2014, incorporated herein by reference), MEF UNI service attributes in Table 4 of MEF 6.2, MEF UNI Service attributes for Ethernet private line (EPL) in Table 7 of MEF 6.2, MEF UNI Service attributes for Ethernet virtual private line (EVPL) in Table 10 of MEF 6.2, MEF UNI Service attributes for Ethernet private local access network (EP-LAN) in Table 13 of MEF 6.2, MEF UNI Service attributes for Ethernet virtual private local access network EVP-LAN in Table 16 of MEF 6.2, MEF UNI Service attributes for Ethernet private tree (EP-Tree) in Table 19 of MEF 6.2, and MEF UNI Service attributes for Ethernet virtual private tree (EVP-Tree) in Table 22 of MEF 6.2. Ethernet configuration attributes may include MEF UNI layer 2 control protocol (L2CP) service attributes for UNI tunnel access (UTA) in Table 18 of MEF 45 (see MEF 35.0.2 Service OAM Performance Monitoring Implementation Agreement Amendment 2, February 2014, which is incorporated by reference herein), MEF UNI L2CP Service Attribute for virtual network interface device (vNID) Case A in Table 23 of MEF 45, and MEF UNI L2CP Service Attribute for vNID Case B in Table 26 of MEF 45.

Layer 2 may include other protocols such as point-to-point (PPP) and point-to-point tunneling protocol (PPTP). Layer 3 (e.g., the network layer) may include attributes pertaining to internet protocol (IP) and/or multiprotocol label switching (MPLS). Layer 3 may include MPLS UNI attributes with fields for LSP ID, MTU, ingress bandwidth profile, egress bandwidth profile, MPLS link down, MPLS Link Up, AIS, RDI, and lock status. Other layer 3 attributes may include IPv4 address, DSCP marking, IPv6 address, IPv4 virtual private network (VPN), and IPv6 VPN. Layer 4 (e.g., the transport layer) attributes may pertain to transmission control protocol (TCP), user datagram protocol (UDP) and/or stream control transmission protocol (SCTP). Layer 5 (e.g., the session layer) attributes may include attributes for NFS, Netbios, names, RPC, and SQL. Layer 6 (e.g., the presentation layer) may include web browsers, NFS, SNMP, Telnet, HTTP, and FTP. Layer 6 attributes may include operational state (enabled or disabled) and administrator state (enable or disabled). The CSUI 310 may include interface level security attributes such as access control list (ACL) attributes and packet encryption attributes. Packet encryption attributes may include IPSec encapsulating security payload (ESP) attributes and secure sockets layer virtual private network (SSL VPN) attributes. The CSUI 310 may include connection authentication attributes such as IPSec authentication header (AH) attributes, TCP-authentication option (TCP-AO) attributes, etc. The CSUI 310 may include security level attributes include rate limiting attributes for DoS attacks (e.g., rate limiting of TCP SYN packets and ICMP/Smurf attributes) and keys for API. The CSUI 310 may include billing attributes for recurring charges and non-recurring charges.

In some embodiments, one or more of the attributes of the CSUI 310 may be dynamic (e.g., configured on-demand). If an attribute is dynamically configured, an entity sending, receiving, or relaying a communication or cloud services (e.g., the CSUI 310 in this instance) may determine the values for dynamic attributes upon receiving an/or generating the communication or cloud service. At a later time, the entity may reconfigure and/or otherwise change the values of the attributes. For the CSUI 310, the MTU attribute, maximum service frame size attribute, connection multiplexing attribute, maximum number of connection termination points attribute, bandwidth profile parameters attributes, and mapping of CoS ID value to CoS name attribute may be dynamic. One or more of the remaining attributes described above may be static attributes (e.g., values of static attributes might not change and, thus, be preset).

The CSI 316 may be defined by one or more of the following attributes. A CSI ID attribute may be an arbitrary text string to identify the CSI 316. A virtual machine ID attribute uses a 128-bit universally unique ID (UUID) as a unique identifier for a VM in an administrative region. List of NaaS attribute employing this VM or server (e.g., application entity is shared or dedicated). An interface protection attribute may have values of (1+1 or 1:1 or none). A connection multiplexing attribute may include values yes or no. The CSI 316 may include a maximum number of connection termination points attribute. Layer 2 of the CSI 316 may include MEF UNI service attributes in Table 4 of MEF 6.2, MEF UNI service attributes for EPL in Table 7 of MEF 6.2, MEF UNI service attributes for EVPL in Table 10 of MEF 6.2, MEF UNI service attributes for EP-LAN in Table 13 of MEF 6.2, MEF UNI service attributes for EVP-LAN in Table 16 of MEF 6.2, MEF UNI service attributes for EP-Tree in Table 19 of MEF 6.2, and MEF UNI service attributes for EVP-Tree in Table 22 of MEF 6.2. Layer 2 may also include other protocols such as PPP and PPTP, virtual machine protection (e.g., a redundant copy of the virtual machine 326, a redundant server, and/or redundant resource offering a cloud service). Layer 2 may also have virtual machine portability with values of yes or no. Virtual machine portability is the ability to move a virtual machine (e.g., the virtual machine 326 to another server, site, or zone. Additionally, data or applications associated with the moved virtual machine may also be moved. Layer 3 (e.g., the network layer) of the CSI 316 may include attributes pertaining to IP and/or MPLS. Layer 3 may include MPLS UNI attributes with fields for LSP ID, MTU, ingress bandwidth profile, egress bandwidth profile, MPLS link down, MPLS Link Up, AIS, RDI, and lock status. Other layer 3 attributes may include IPv4 address, DSCP marking, IPv6 address, IPv4 VPN, IPv6 VPN, and network address translation (NAT). Layer 4 (e.g., the transport layer) of the CSI 316 may include attributes for Transmission Control Protocol (TCP), User Datagram Protocol (UDP) and Stream Control Transmission Protocol (SCTP). General ports supported by layer 4 include 32111 TCP and 9427 TCP. The 32111 TCP port may be open in both directions between user VMware view virtual desktop and user VMware view client, which may facilitate USB redirection between user VMware view client and the user VMware virtual desktop. The 9427 TCP port may support multimedia redirection (MMR) by the user VMware view client. The 9427 TCP port may also support user VMWare view client with offline desktop where MMR might not be supported in both directions.

Layer 4 may also support PC over IP (PCoIP) Ports including 50002TCP/UDP and 4172 TCP/UDP. The 50002TCP/UDP port may be ssed for PCoIP in a VMware View 4.0.x and later environment. This port may also be used for the PCoIP display protocol on the software client if opened in both inbound and outbound directions. The 4172 TCP/UDP port may be used for PCoIP in a VMware View 4.5 and later environment. The 4172 UDP port may be used for the PCoIP display protocol if open in both inbound and out-bound directions. The 4172 TCP port may only be open the inbound direction to support the display protocol. Layer 4 may also support remote desktop protocol (RDP) ports such as 3389 TCP port. The 3389 TCP port may be used in a view environment where Microsoft RDP is the preferred display protocol. The 3389 TCP port may be open between either the user VMWare view client and the user VMWare virtual desktop, or the VMware view connection or security server and the user VMWare virtual desktop. Layer 4 may also support connection server ports such as 4001 TCP port, which may be open in the out-bound direction so a view agent can report its status to the connection broker to which it is bound. Layer 5 (e.g., the session layer) may support attributes for NFS, NetBios names, RPC and SQL. Layer 6 (e.g., the presentation layer) may support attributes for ASCII, EBCDIC, TIFF, GIF, PICT, JPEG, MPEG, and MIDI. Layer 7 (e.g., the application layer) may support attributes for web browsers, NFS, SNMP, Telnet, HTTP, and FTP. Each of these may have an operational state attribute with the values of either enabled or disabled. Similarly, each of these may have an administrator state attribute with values of either enabled or disabled. The CSI 316 may also include one or more security attributes. A security attribute may include an SSL termination attribute with terminating SSL traffic for services such as a load balancer providing centralized certificate management, SSL acceleration for improved throughput, reduced CPU load at the application servers for improved performance, and HTTP and HTTPS session persistence. One or more security attributes may include an ACL attribute, a packet encryption attribute with fields for IPSec encapsulating security payload (ESP) and SSL VPN, and a connection authentication attribute with fields for IPSec AH and TCP-AO. One or more security attributes may include a security level attribute that limits rates of DoS attacks and excessive resource consumption, a data confidentiality (e.g., privacy) attribute that prevents, via logical separation, tenants from eavesdropping on each other, and a session layer security attribute that supports representational state transfer application programming interface (REST API) over SSL/TLS and API keys. The CSI 316 may support attributes for billing (e.g., recurring charges and non-recurring charges).

In some embodiments, one or more of the attributes of the CSI 316 may be dynamic (e.g., configured on-demand). For instance, the MTU attribute, maximum service frame size attribute, bandwidth profile parameters attributes, portability attribute, virtual machine protection attribute and server protection attribute may be dynamic. One or more of the remaining attributes described above may be static attributes.

The CC-CP-I 322 may be defined by one or more of the following attributes. A CC-CP-I ID attribute may be an arbitrary string to identify the CC-CP-I 322. A name of cloud service provider ID attribute may be an arbitrary string to identify the cloud service provider 308. The CC-CP-I's 322 physical interface (e.g., layer 1) may include an Ethernet attribute with fields for speed, mode, physical medium, and/or a MAC layer. The physical layer may also include a DOCSIS attribute, EPON attribute, GPON attribute, a WDM attribute, a SONET/SDH attribute, each with fields for speed, mode, and physical medium. The physical interface may include an OTN attribute, a MTU attribute (with a recommended values of greater than or equal to 1522 bytes), a connection multiplexing attribute (which may include the values of yes or no), and a maximum number of connection termination points attribute. The CC-CP-I's 322 layer 2 (e.g., the data link layer) may include Ethernet configuration attributes. Ethernet configuration attributes may include MEF UNI service attributes for Ethernet private services found in table 2 of MEF 26.1 (see MEF 26.1 External Network Network Interface (ENNI)—Phase 2, January 2012, incorporated herein by reference). Ethernet configuration attributes may include MEF ENNI L2CP service attributes for access EPL in Table 17 of MEF 45, MEF ENNI L2CP Service Attributes for UTA in Table 20 of MEF 45, MEF ENNI L2CP Service Attributes for vNID Case A in Table 25 of MEF 45, and MEF ENNI L2CP Service Attributes for vNID Case B in Table 28 of MEF 45. Ethernet configuration attributes may include Ethernet service, operations, administration, and maintenance (SOAM) attributes for maintenance entity group (MEG) ID, maintenance end point (MEP) ID, MEP level, LAG MEG, and LAG link MEG. Layer 2 may include other protocols such as point-to-point (PPP) and point-to-point tunneling protocol (PPTP). Layer 3 (e.g., the network layer) may include attributes pertaining to IP and/or MPLS. Layer 3 may include MPLS UNI attributes with fields for LSP ID, MTU, ingress bandwidth profile, egress bandwidth profile, MPLS link down, MPLS Link Up, AIS, RDI, and lock status. Other layer 3 attributes may include fast reroute, NAT, IPv4 subnet address, DSCP marking, IPv6 subnet address, IPv4 VPN, and IPv6 VPN. The CC-CP-I 322 may include interface level security attributes between the cloud providers 304 and the cloud carrier 302. The security attributes may include ACL attributes and packet encryption attributes. Packet encryption attributes may include IPSec ESP attributes and SSL VPN attributes. The CC-CP-I 322 may include connection authentication attributes such as IPSec AH attributes. The CC-CP-I 322 may include security level attributes include rate limiting attributes for DoS attacks and excessive resource consumption. The CC-CP-I 322 may include data confidentiality (e.g., privacy) attributes to prevent, via logical separation, tenants from eavesdropping on each other. In many instances, the attributes of the CC-CP-I 322 are more likely to be static (e.g., not dynamically configured).

In addition to the interfaces, the CSCTP 312 may also be defined by one or more of the following attributes. The CSCTP ID attribute may include an arbitrary text string to identify the CSCTP 312. A CSUI ID attribute, a CSI ID attribute, and a CSC ID attribute may be an arbitrary string to identify the CSUI 310, the CSI 316, and the CSC, respectively. The CSCTP 312 may include overlay network attributes such as a virtual access point (VAP) ID (e.g., a string to identify a VAP) and NVE interface ID (e.g., 4 decimal digits that identify the NVE interface). The CSCTP's 312 layer 2 (e.g., the data link layer) may include Ethernet configuration attributes. Ethernet configuration attributes may include MEF EVC per UNI Service attributes in Table 5 of MEF 6.2, MEF EVC per UNI Service attributes for EPL Service in Table 8 of MEF 6.2, MEF EVC per UNI Service attributes for EVPL Service in Table 11 of MEF 6.2, MEF EVC per UNI Service attributes for EP-LAN Service in Table 14 of MEF 6.2, MEF EVC per UNI Service attributes for EVP-LAN Service in Table 18 of MEF 6.2, MEF EVC per UNI Service attributes for EP-Tree Service in Table 20 of MEF 6.2, and MEF EVC per UNI Service attributes for EVP-Tree Service in Table 23 of MEF 6.2. Ethernet configuration attributes may include MEF EPL Option 2 L2CP processing requirements in Table 8 of MEF 45 and MEF EPL Option 2 L2CP processing recommendations in Table 9 of MEF 45. Ethernet configuration attributes may include protection attributes that provide a redundant CSCTP on a different physical port of the same cloud service user 306 or a different cloud service user 306 at the CSUI 310. The redundant CSCTP may also be on a different virtual machine 326 at the CSI 316. Ethernet configuration attributes may include Ethernet SOAM attributes such as MEG ID attribute, a MEP ID attribute, and a MEP level attribute. Layer 3 of the CSCTP 312 may include an IPv4 subnet address attribute, an IPv6 subnet address attribute, a DSCP mapping attribute, and bandwidth profile with fields for CIR, CBS, EIR, and EBS. Layer 3 may also include protection attributes similar to layer 2. Layer 3 of the CSCTP 312 may include an LSP label attribute, an EXP mapping attribute, an operation state attribute with values of enabled or disabled, and an administrator state attribute with fields of enabled or disabled. The CSCTP 312 may include security attributes such as packet encryption attributes with fields for IPSec ESP and SSL VPN, connection authentication attributes with fields for IPSec AH and TCP-AO, data confidentiality attributes that provide a logical separation of the CSCTPs 312 to limit the rate of DoS attacks and excessive resource consumption, and service security level attributes that limit the rate of DoS attacks and excessive resource consumption.

In some embodiments, one or more attribute may be dynamic (e.g., configured on-demand). Such attributes may include bandwidth profile parameters attributes, CoS category attribues, PCP mapping attributes, DSCP mapping attributes, EXP mapping attributes, CSCTP protection attributes, L2CP treatment attribute, IP subnet addresses attributes, and/or administrative state attributes. One or more of the remaining attributes described above may be static attributes.

In addition to interface and the CSCTP 312 having one or more attributes, the CSC itself may include one or more of the following attributes. A CSC ID attribute may be an arbitrary text string to identify the CSC. The CSC may have a list of associated CSCTP IDs attribute that lists potential CSCTP's 312 with which it may establish the connection. The CSC may have a type attribute with fields for point-to-point, point-to-multipoint, and multipoint-to-multipoint. The CSC may include protection attributes (similar to as described above). Layer 2 of the CSC may include Ethernet connection attributes such as MEF EVC service attributes in Table 6 of MEF 6.2, MEF EVC Service attributes of EPL in Table 9 of MEF 6.2, MEF EVC Service attributes of EVPL in Table 12 of MEF 6.2, MEF EVC Service attributes of EP-LAN in Table 15 of MEF 6.2, MEF EVC Service attributes of EVP-LAN in Table 18 of MEF 6.2, MEF EVC Service attributes of EP-Tree in Table 21 of MEF 6.2, MEF EVC Service attributes of EVP-Tree in Table 24 of MEF 6.2, and MEF EVC Performance attributes and Parameters per CoS in Table 25 of MEF 6.2. Layer 3 of the CSC may include connection attributes such as service level objections (SLOs) attributes with values or fields for delay, jitter. Other connection attributes include MTU attributes and type attribute (with values for point-to-point, multipoint-to-point, and multipoint-to-multipoint). Layer 3 may also include a connection start time attribute which may be specified in seconds in coordinated universal time (UTC). Layer 3 may also include a connection start interval attribute to represent the acceptable interval after the start time during which the service attribute modifications may be made. The interval may be specified in seconds in UTC. Layer 3 of the CSC may also include a connection duration attribute and connection period attribute each of which may be specified in days, minutes, and/or seconds. Layer 3 of the CSC may also include an operational state and administrative state attributes each of which may have values of enabled or disabled. Layer 3 of the CSC may also include billing options with fields for monthly, hourly, etc.

In some embodiments, one or more of the attributes of the CSC may be dynamic (e.g., configured on-demand). Dynamic attributes may include the list of CSCTP IDs attribute, the connection start time attribute, the connection end time attribute, the administrative state attribute, the maximum frame size or MTU attribute, and the SLOs attribute. One or more of the remaining attributes described above may be static attributes.

Referring back to FIG. 3, each entity illustrated in this figure (e.g., CSUI 310, cloud carrier 302, cloud provider 304, CC-CP-I 322, CSI 316, CP-CP-I 324, etc.) may format communication so that they are in accordance with the attributes of other entities. As an example, the cloud provider 302 may format communications in accordance with one or more attributes of a CC-CP-I 322 and/or one or more attributes of a CSCTP 312.

Figures 7, 8:
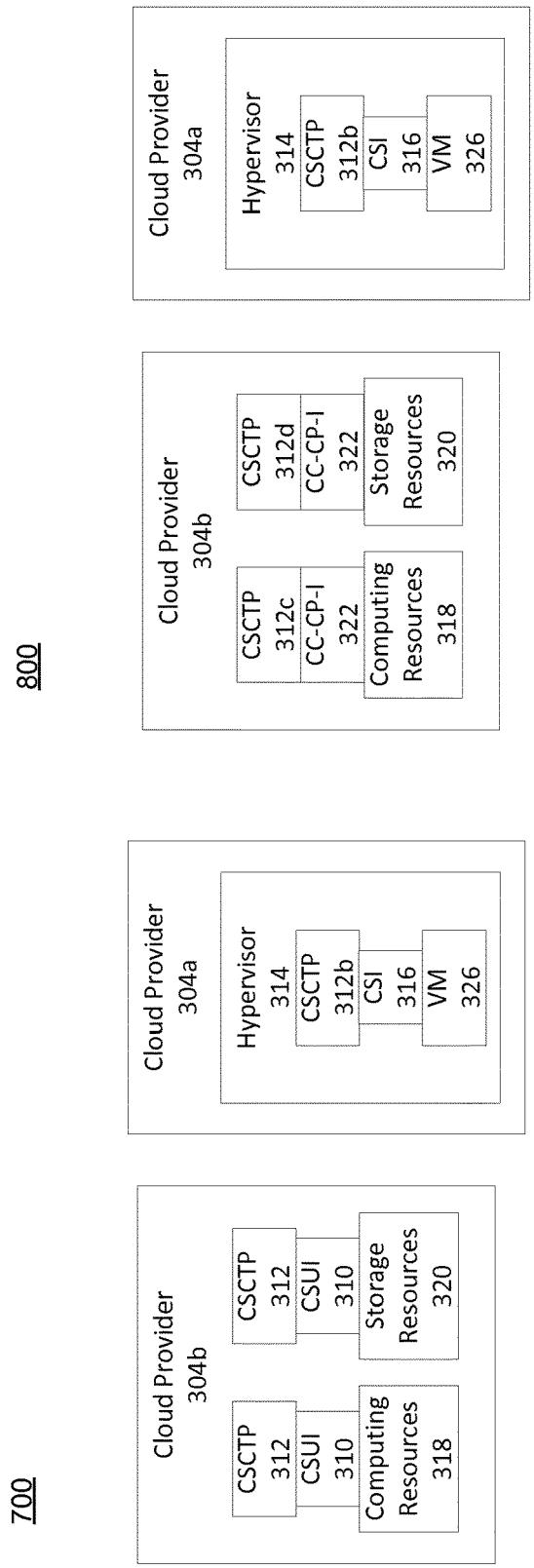
FIGS. 7 and 8 depict example architectures in accordance with one or more example aspects discussed herein.

FIGS. 7 and 8 depict example architectures in accordance with one or more example aspects discussed herein. In FIG. 7, physical resources of a cloud provider 304 (e.g., the cloud provider 304b) may interface with the cloud carrier 302 (not shown) via the CSUI 310. Virtual resources of a cloud provider 304 (e.g., the cloud provider 304a) may interface with the cloud carrier 302 via the CSI 316. The cloud provider 304b may, via the CSUI 310, make its physical computing resources 318 and its storage resources 320 available to the cloud service user 306 so that the cloud service user 306 may store information and/or retrieve information (e.g., movies, music, documents, etc.). The cloud provider 304a may, via the CSI 316, make its resources (e.g., virtual desktop and/or one or more virtual applications) available to a cloud service user 306.

In an alternative arrangement to FIG. 7, cloud provider 304a, rather than having the virtual machine 326, may have a virtual container that may interface with the CSI 316. A virtual container executes as an application with the operating system. As a result, multiple virtual containers can share the same operating system and possible other resources.

Additionally or alternatively to FIG. 7, in FIG. 8, physical resources of a cloud provider 304 (e.g., the cloud provider 304b) may interface with the cloud carrier 302 (not shown) via the CC-CP-I 322. Virtual resources of a cloud provider 304 (e.g., the cloud provider 304a) may interface with the cloud carrier 302 via the CSI 316. The cloud provider 304b may, via the CC-CP-I 322, make its physical computing resources 318 and its storage resources 320 available to the cloud service user 306 so that the cloud service user 306 may store information and/or retrieve information (e.g., movies, music, documents, etc.). The cloud provider 304a may, via the CSI 316, make its resources (e.g., virtual desktop and/or one or more virtual applications) available to a cloud service user 306.

Figure 9:
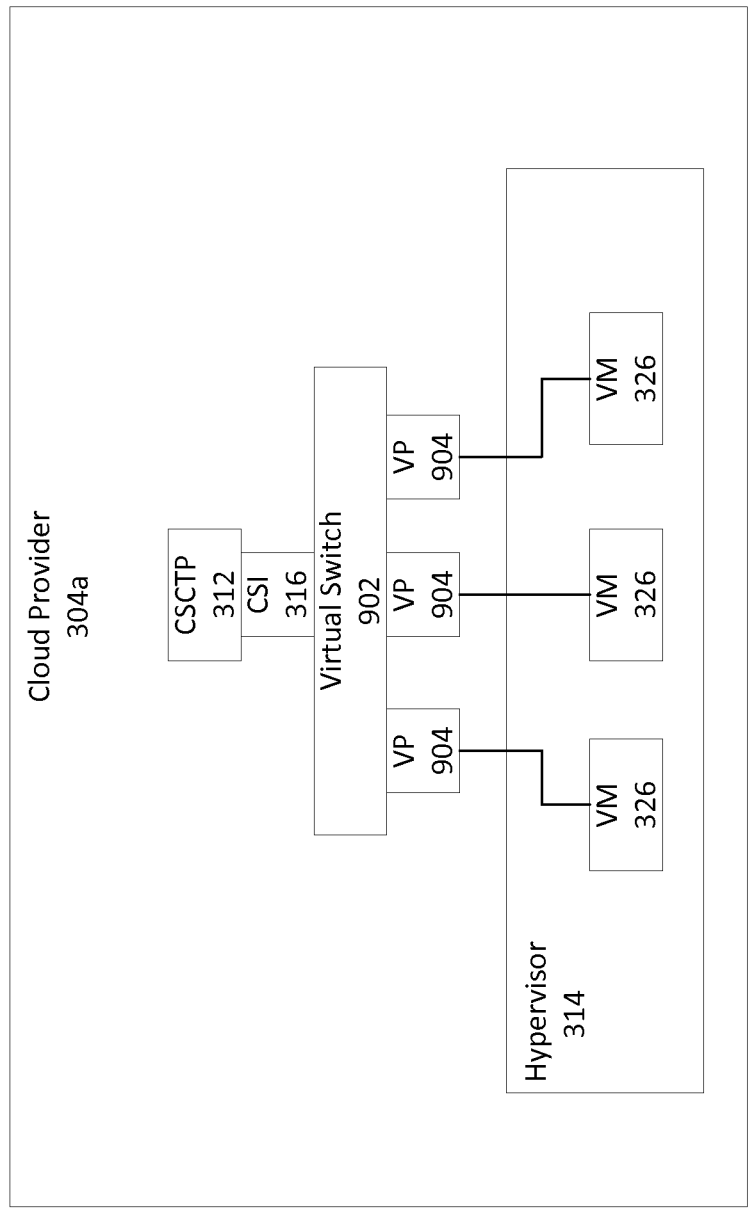
FIG. 9 depicts an architecture including a virtual switch in accordance with one or more example aspects discussed herein.

FIG. 9 depicts an architecture 900 including a virtual switch in accordance with one or more example aspects discussed herein. In this scenario, a hypervisor 314 of a cloud provider (e.g., the cloud provider 304a) may generate multiple different virtual machines 316 to provide virtual resources to one or more cloud service users 306. The cloud provider 304a may include one or more CSCTPs 312 associated with the CSI 316. In order to permit a single CSC to access each of the multiple virtual machines 316, the cloud provider 304a may include a virtual switch 902 and multiple virtual ports 904 with a different port 904 for each virtual machine 326. The cloud provider 304a may be responsible for managing the virtual switch 902. For instance, the cloud provider 304a may use the virtual switch 902 to switch the CSC from one virtual machine 326 to a different virtual machine 326. As a result, a single CSC may interact with many different virtual machines 316.

Figure 10:
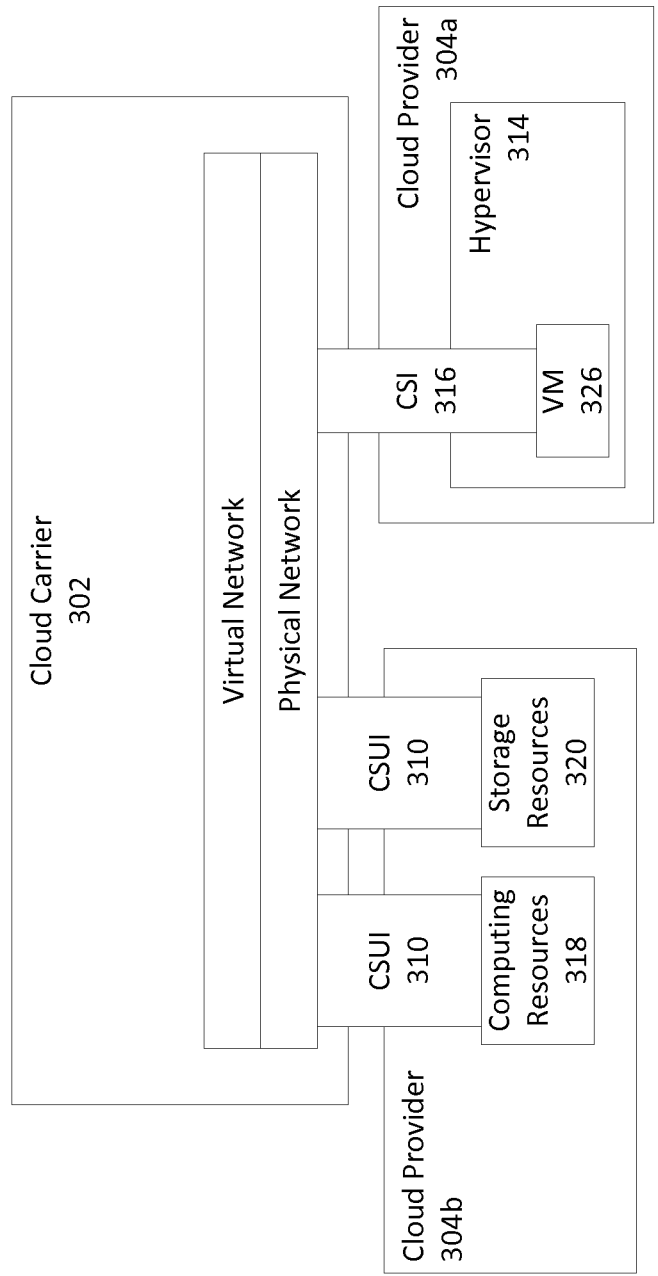
FIGS. 10 and 11 depict example architectures in accordance with one or more example aspects discussed herein.
Figure 11:
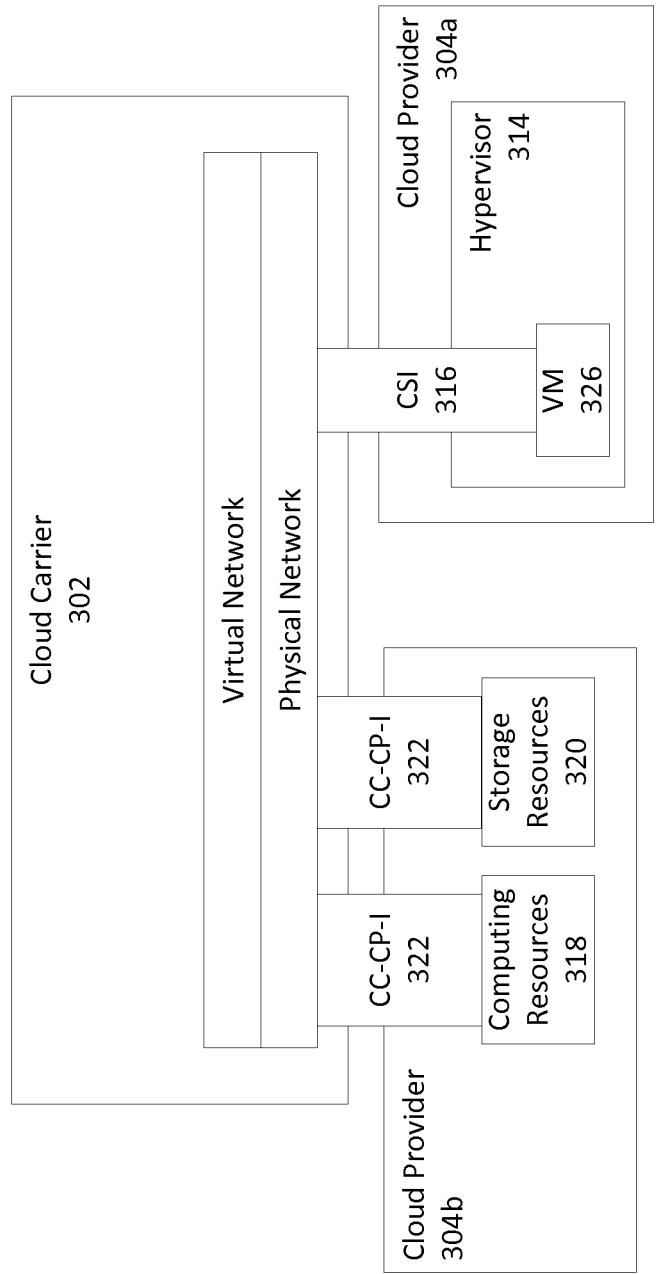

FIGS. 10 and 11 depict example architectures 1000 and 1100 in accordance with one or more example aspects discussed herein. Similar to FIG. 7, FIG. 10 illustrates that physical resources of a cloud provider 304 may interface with the cloud carrier 302 via the CSUI 310 and virtual resources of a cloud provider 304 may interface with the cloud carrier 302 via CSI 316. Similar to FIG. 8, FIG. 11 illustrates that physical resources of a cloud provider 304 may interface with the cloud carrier 302 via the CC-CP-I 322 and virtual resources of a cloud provider 304 may interface with the cloud carrier 302 via CSI 316.

Figure 12:
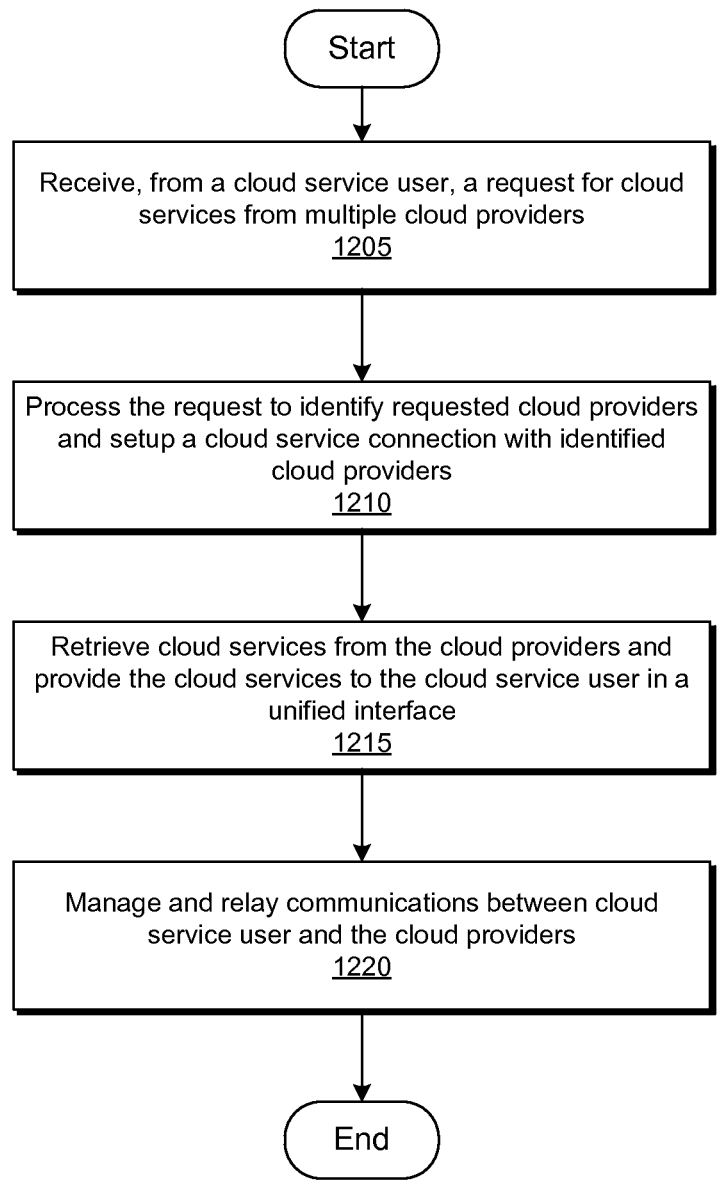
FIG. 12 depicts a flowchart of an example method of providing a user with services from multiple providers in accordance with one or more example aspects discussed herein.

FIG. 12 depicts a flowchart of an example method of providing a cloud service user 306 with cloud services from multiple cloud providers 304 in accordance with one or more example aspects discussed herein. In one or more embodiments, the method of FIG. 12 and/or one or more steps thereof may be performed by a computing device. In other embodiments, the method illustrated in FIG. 12 and/or one or more steps thereof may be embodied in computer-executable instructions that are stored in a computer-readable medium, such as a non-transitory computer-readable memory.

Prior to performing the steps of FIG. 12, each of the cloud providers 304 may have registered with cloud carrier 302 and have been configured to support various interfaces (e.g., CSUI 310, CC-CP-I 322, and CP-CP-I 324), CSCs, and CSCTPs 312. Additionally, in some embodiments, the cloud carrier 302 may store user access credentials of the cloud service user 306 for each of the cloud providers 304.

Prior to the cloud carrier 302 receiving a request, a CSUI 310 may be installed on the cloud service user 306 (e.g., a STB, DVR, smartphone, tablet computer, laptop, personal computer, or other computing device) and present a user interface to a user to permit the user to initiate a request for cloud services from cloud providers 304. If the user initiates a request, the CSUI 310 may intercept and format the request for transmission to the cloud carrier 302. For instance, the CSUI 310 may identify CSCTP 312b of the cloud service provider 3081 format the request according to the one or more attributes of the CSCTP 312b, and transmit the request to CSCTP 312b, which may then relay the request to the cloud carrier 302.

As seen in FIG. 12, the method may begin at step 1205 in which a cloud carrier (e.g., cloud carrier 302) may receive, from a cloud service user 306, a request for cloud services associated with multiple cloud providers 304. The request may include one or more of an identifier to cloud service user, user access credentials (e.g., username and password, PKI certificate, etc.) for the cloud carrier 302, MAC address, identifiers of the cloud providers 304, identifiers of the accounts of the cloud service user 306 for the cloud providers 304, and/or types of cloud services. Some of the information in the request may be specified by a user using their computing device while other information such as the MAC address may be automatically generated by the computing device.

The cloud carrier 302 may determine whether the user access credentials are authentic. For instance, the cloud carrier 302 may include a database of user access credentials for the cloud carrier 302 for each of its cloud service users 306. The cloud carrier 302 may compare the received user access credentials with each of the user access credentials stored in the database. If there is a match, the cloud service user 306 may be identified as authentic. Otherwise, the cloud service user may be identified as not authentic and a message indicating that there was not a match may be sent to the cloud service user 306. Alternatively, in some embodiments, rather than receiving the user access credentials, the cloud service user 306 may be automatically authenticated using other information provided in the request. As an example, the cloud service user 306 may be automatically authenticated if the request is sent from a MAC address associated with the cloud service user's 306 account.

Once authenticated, the cloud carrier 302 may, at step 1210, process the request to identify the requested cloud providers 304 and setup a cloud service connection (CSC) with the identified cloud providers 304. For instance, the cloud carrier 302 may identify the cloud service user 306 has requested the cloud services provided by cloud providers 304a,b. Alternatively, rather than the request specifying the cloud providers 304, each of the cloud providers 304 with which the cloud service user 306 has an account may be identified. For instance, the cloud carrier 302 may include a database of accounts its users have with the cloud providers and use this database to identify the cloud providers 304 with which the cloud service user 306 has previously setup an account, and also identify the type of cloud services associated with the account (e.g., cloud storage, virtual desktop, etc.). The database may be indexed by an identifier of the cloud service user 306, which may have been received in the request as noted above.

In addition, the cloud carrier 302 may setup one or more CSCs with the identified cloud providers 304. The one or more CSCs may include one or more of the attributes of CSCs discussed above. In some instances, a single CSC may interact with multiple cloud providers through the use of a virtual switch. In other instances, multiple CSCs may be formed to interact with the multiple cloud providers 304.

In one or more arrangements, in order to setup a CSC between the cloud carrier 302 and the cloud providers 304, the user access credentials of the cloud service user 304 corresponding to each of the identified cloud providers 304 may be authenticated. The cloud carrier 302 may store user access credentials of the cloud service user 306 for each of the cloud providers 304 in a database, and may transmit, to a particular cloud provider 304 for authentication, the user access credentials of the cloud service user 306 and corresponding to the particular cloud provider 304. If authentic, the cloud provider 304 may send a verification acknowledgement to the cloud carrier 302 thereby establishing the CSC between the cloud carrier 302 and that cloud provider 304. Additionally or alternatively, in some embodiments, the cloud providers 304 may agree that the cloud carrier 302 may perform the only authentication of the cloud service user 306 and, as a result, user access credentials might not be sent to the cloud providers 304.

At step 1215, the cloud carrier 302 may retrieve the requested cloud services from the cloud providers 304 and provide the cloud services to the cloud service user 306 in a single unified interface. For instance, links to physical resources (e.g., the files and folders stored in cloud storage) of the cloud providers 304 and associated with the cloud service user 306 may be sent from one or more of the cloud providers 304 to the cloud carrier 302. Further, virtual resources (e.g., virtual desktops, virtual applications, etc.) associated with the cloud service user 306 may be sent from one or more cloud providers 304 to the cloud carrier 302. The cloud carrier 302 may aggregate the physical and virtual resources for presentation in a single user interface. The cloud provider 302 may then transmit the aggregated resources to the cloud service user 306 for display using the CSUI 306. As a result, the cloud service user 306 presents, to an individual, a single user interface with links to each of the individual's files and folders stored in cloud storage at multiple different cloud providers 304, as well as displays windows for each virtual resource from different cloud providers 304.

At step 1220, the cloud carrier 302 may manage and relay communications between cloud service user 306 and the cloud providers 304. For instance, selections of a link to a folder or file by the cloud service user 306 may be relayed to the appropriate cloud provider 304 to obtain the requested file or folder, which may then be relayed to the cloud service user 306. For instance, inputs into a virtual application may be relayed to the appropriate cloud provider 304 for processing, and the resulting output of the processing may be relayed to the cloud service user 306 for presentation. In some embodiments, the CSC may terminate when the cloud service user 306 logs out or after a timeout period has elapsed.

As a result, of the aggregation of cloud services by the cloud carrier 302 and the presentation of the cloud services in a single uniform interface, an individual has a single point of contact with each (e.g., all) of the cloud providers 304 and the individual has seamless access to any of individual's cloud services through the single uniform interface thereby enhancing the individual's user experience.

Figure 13:
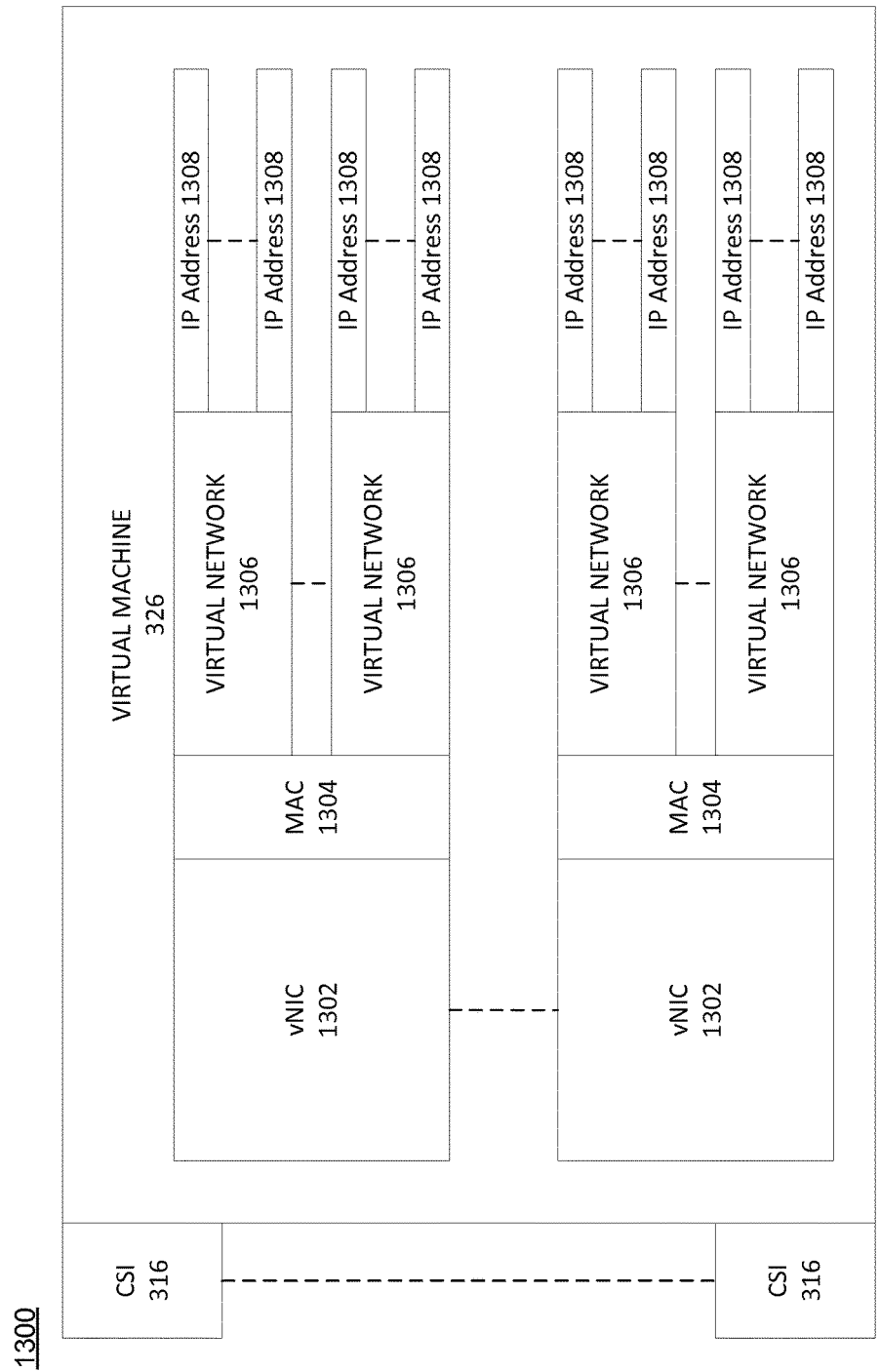
FIG. 13 depicts an example architecture in accordance with one or more example aspects discussed herein.

FIG. 13 depicts an example architecture 1300 in accordance with one or more example aspects discussed herein. A virtual machine (e.g., the virtual machine 326) may consist and/or otherwise support multiple CSIs 316, virtual network interface controllers (VNICs) 1302, software MAC addresses 1304, virtual networks 1306, and IP addresses 1308, as depicted in FIG. 13. Each VNIC 1302 may be identified by a soft MAC address 1304, and may map to a CSI 316.

As described above, various aspects of the disclosure relate to enabling a user to seamlessly access cloud services provider by multiple different cloud service providers simultaneously. Although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A system comprising:
a user device; and
a cloud carrier device communicatively coupled to a first cloud provider, of a plurality of cloud providers, and to a second cloud provider, of the plurality of cloud providers and different from the first cloud provider;
wherein the cloud carrier device is communicatively coupled to the user device via a cloud service user interface associated with a physical layer comprising data over cable service interface specification (DOCSIS) attributes; and
wherein the cloud carrier device comprises:
one or more processors;
memory storing instructions that, when executed by the one or more processors, cause the cloud carrier device to:
coordinate access of cloud services of the first cloud provider and cloud services of the second cloud provider by the user device; and
relay communications between the cloud carrier device and at least one of the plurality of cloud providers; and
an interface associated with an Internet Protocol version 6 (IPv6) virtual private network (VPN) attribute and an Internet Protocol version 4 (IPv4) VPN attribute.

2. The system of claim 1, wherein the interface is associated with metro Ethernet forum (MEF) external network-network interface (ENNI) service attributes, MEF ENNI layer 2 control protocol (L2CP) attributes for user network interface (UNI) tunnel access (UTA), and virtual network interface device (vNID) attributes.

3. The system of claim 1, wherein the interface is associated with multiprotocol label switching (MPLS) user network interface (UNI) attributes.

4. The system of claim 1, wherein the cloud service user interface is further associated with a data link layer, a network layer, a transport layer, a session layer, a presentation layer, and an application layer.

5. The system of claim 4, wherein the data link layer associated with the cloud service user interface comprises a metro Ethernet forum (MEF) user network interface (UNI) service attribute for Ethernet private services.

6. The system of claim 1, wherein the cloud carrier device comprises a second interface communicatively coupled to a virtual machine of the user device, wherein the virtual machine is generated by a cloud provider of the plurality of cloud providers, and wherein the second interface is associated with a data link layer, a network layer, a transport layer, a session layer, a presentation layer, and an application layer.

7. The system of claim 6, wherein the second interface is associated with identifiers of one or more virtual machines, a list of networks as a service employed by the one or more virtual machines, and a connection multiplexing attribute.

8. The system of claim 7, wherein the data link layer associated with the second interface comprises metro Ethernet forum (MEF) user network interface (UNI) service attributes for Ethernet private line (EPL), MEF UNI service attributes for Ethernet virtual private line (EVPL), MEF UNI service attributes for Ethernet private local access network (EP-LAN), MEF UNI service attributes for Ethernet virtual private local access network (EVP-LAN), MEF UNI service attributes for Ethernet private tree (EP-Tree), and MEF UNI service attributes for Ethernet virtual private tree (EVP-Tree).

9. The system of claim 1, wherein the instructions, when executed by the one or more processors, cause the cloud carrier device to permit modification of service attributes only during a time interval beginning at a time at which a connection is established between the cloud carrier device and a cloud provider of the plurality of cloud providers.

10. The system of claim 1, wherein the instructions, when executed by the one or more processors, cause the cloud carrier device to:
authenticate user credentials of the cloud carrier device; and
after determining that the user credentials of the cloud carrier device are authentic,
send, to the first cloud provider, user credentials of the first cloud provider; and
send, to the second cloud provider, user credentials of the second cloud provider.

11. A system comprising:
a user device; and
a cloud carrier device communicatively coupled to a first cloud provider, of a plurality of cloud providers, and to a second cloud provider, of the plurality of cloud providers and different from the first cloud provide;
wherein the cloud carrier device is communicatively coupled to the user device via a cloud service user interface associated with a physical layer comprising data over cable service interface specification (DOCSIS) attributes; and
wherein the cloud carrier device comprises:
one or more processors;
memory storing instructions that, when executed by the one or more processors, cause the cloud carrier device to coordinate access of cloud services of the first cloud provider and cloud services of the second cloud provider by the user device; and
an interface communicatively coupled to a cloud provider of the plurality of cloud providers, wherein the interface is associated with identifiers of one or more virtual machines, a list of networks as a service employed by the one or more virtual machines, and a connection multiplexing attribute.

12. The system of claim 11,
wherein the cloud service user interface is further associated with a data link layer, a network layer, a transport layer, a session layer, a presentation layer, and an application layer,
wherein the data link layer associated with the cloud service user interface comprises a metro Ethernet forum (MEF) user network interface (UNI) service attribute for Ethernet private services, MEF UNI layer 2 control protocol (L2CP) service attributes for UNI tunnel access (UTA), MEF UNI L2CP service attributes for virtual network interface device (vNID), a MEF UNI service attribute for Ethernet private line (EPL), a MEF UNI service attribute for Ethernet virtual private line (EVPL), MEF UNI service attributes for Ethernet private local access network (EP-LAN), UNI service attributes for Ethernet virtual private local access network (EVP-LAN), MEF UNI service attributes for Ethernet private tree (EP-Tree), and MEF UNI service attributes for Ethernet virtual private tree (EVP-Tree).

13. The system of claim 11, wherein the instructions, when executed by the one or more processors, cause the cloud carrier device to permit modification of service attributes only during a time interval beginning at a time at which a connection is established between the cloud carrier device and a cloud provider of the plurality of cloud providers.

14. The system of claim 13,
wherein the interface is associated with a data link layer comprising metro Ethernet forum (MEF) external network-network interface (ENNI) service attributes, MEF ENNI layer 2 control protocol (L2CP) attributes for user network interface (UNI) tunnel access (UTA), and virtual network interface device (vNID) attributes.

15. A method comprising:
coordinating, by a cloud carrier device with a user device, access of cloud services of a first cloud provider of a plurality of cloud providers, and access of cloud services of a second cloud provider of the plurality of cloud providers, wherein the first cloud provider is different from the second cloud provider; and
relaying communications between the cloud carrier device and at least one of the plurality of cloud providers,
wherein the cloud carrier device is communicatively coupled to the user device via a cloud service user interface associated with a physical layer comprising data over cable service interface specification (DOCSIS) attributes; and
wherein the cloud carrier device comprises an interface associated with an Internet Protocol version 6 (IPv6) virtual private network (VPN) attribute and an Internet Protocol version 4 (IPv4) VPN attribute.

16. The method of claim 15, further comprising:
permitting modification of service attributes only during a time interval beginning at a time at which a connection is established between the cloud carrier device and a cloud provider of the plurality of cloud providers.

17. The method of claim 15, further comprising:
authenticating user credentials of the cloud carrier device.

18. The method of claim 17, further comprising, after determining that the user credentials of the cloud carrier device are authentic:
- sending, to the first cloud provider, user credentials of the first cloud provider; and
- sending, to the second cloud provider, user credentials of the second cloud provider.

* * * * *

UNITED STATES PATENT AND TRADEMARK OFFICE
CERTIFICATE OF CORRECTION

PATENT NO. : 10,193,864 B2
APPLICATION NO. : 14/860641
DATED : January 29, 2019
INVENTOR(S) : Mehmet Toy It is certified that error appears in the above-identified patent and that said Letters Patent is hereby corrected as shown below:

Sheet 11 of 11, Fig. 13, Reference Numeral 1302, Line 1 (First Occurrence):
Please delete "vNIC" and insert --VNIC--

Sheet 11 of 11, Fig. 13, Reference Numeral 1302, Line 1 (Second Occurrence):
Delete "vNIC" and insert --VNIC--

Column 5, Detailed Description, Line 34:
Delete "servicer" and insert --server--

Column 7, Detailed Description, Line 54:
Delete "304b." and insert --308.--

Column 8, Detailed Description, Line 6:
Delete "304" and insert --308--

Column 10, Detailed Description, Line 2:
Delete "320" and insert --302--

Column 10, Detailed Description, Line 10:
Delete "servicer" and insert --service--

Column 13, Detailed Description, Line 40:
Delete "ssed" and insert --used--

Column 16, Detailed Description, Line 7:
Delete "attribues," and insert --attributes,--

Column 16, Detailed Description, Line 65:
Delete "302" and insert --304--

Signed and Sealed this
Twenty-ninth Day of October, 2019

Andrei Iancu
*Director of the United States Patent and Trademark Office*

CERTIFICATE OF CORRECTION (continued)
U.S. Pat. No. 10,193,864 B2

Column 17, Detailed Description, Line 41:
Delete "316" and insert --326--

Column 17, Detailed Description, Line 45:
Delete "316," and insert --326,--

Column 17, Detailed Description, Line 53:
Delete "316." and insert --326.--

Column 18, Detailed Description, Line 25:
Delete "3081" and insert --308--

Column 19, Detailed Description, Line 21:
Delete "304" and insert --306--

Column 19, Detailed Description, Line 50:
Delete "302" and insert --304--

Column 19, Detailed Description, Line 52:
Delete "306." and insert --310.--

Column 21, Claim 11, Line 55:
Delete "provide;" and insert --provider;--